TUNABLE ELECTRONIC PRESELECTOR FOR A RADIO RECEIVER
Filed Nov. 26, 1968
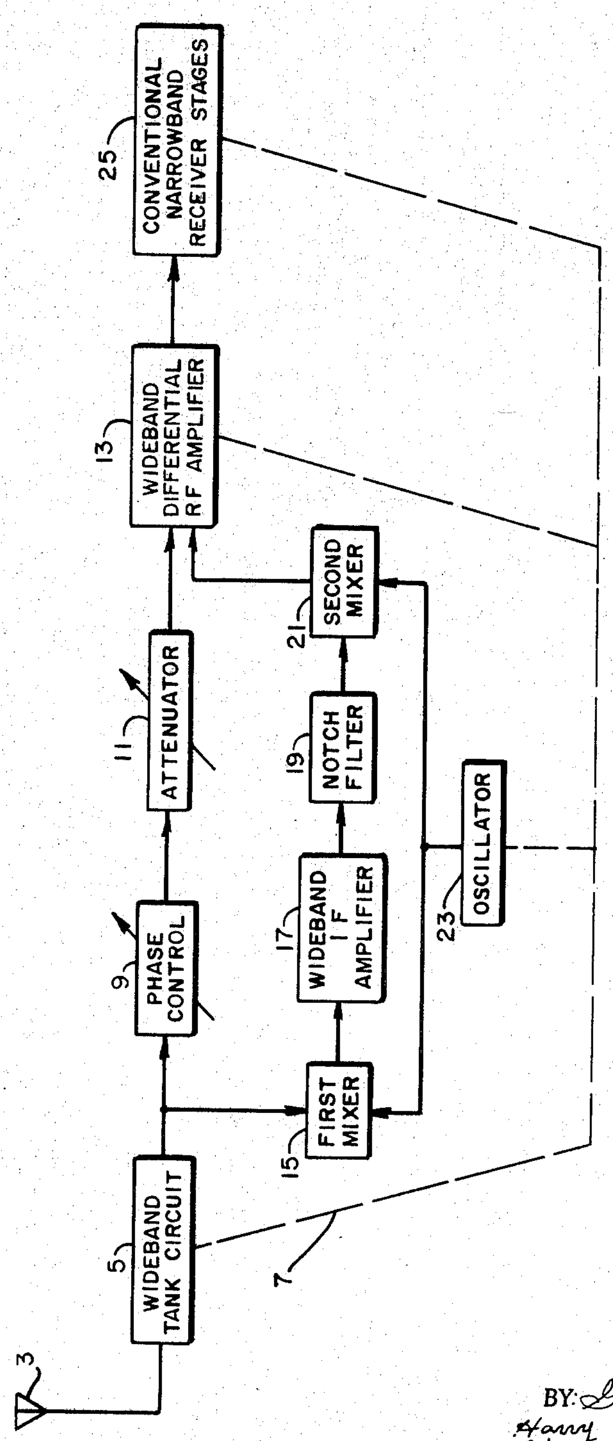
INVENTORS,
PALEMON W. DUBOWICZ
JOHN S. SLECHTA.
BY: Gordon W. Kerr
Harry M. Saragovitz,
Edward J. Kelly &
Herbert Berl
ATTORNEYS.

United States Patent Office 3,550,011
Patented Dec. 22, 1970

3,550,011

TUNABLE ELECTRONIC PRESELECTOR FOR A RADIO RECEIVER

Palemon W. Dubowicz, Eatontown, and John S. Slechta, Shrewsbury, N.J., assignors to the United States of America as represented by the Secretary of the Army Filed Nov. 26, 1968, Ser. No. 779,041
Int. Cl. H04b *1/10*
U.S. Cl. 325—475 5 Claims

ABSTRACT OF THE DISCLOSURE

A band of frequencies centered on a desired channel is selected by means of a wideband tunable circuit and this band is heterodyned down to an intermediate frequency. The desired channel is removed from the IF by means of a notch filter and the remaining undesired channels are heterodyned up to their original frequencies and subtracted from the original group of received channels to yield only the desired channel.

The invention described herein may be manufactured, used, and licensed by or for the Government for governmental purposes without the payment to us of any royalty thereon.

The present invention comprises novel and useful radio receiver circuitry and more specifically to an electronic preselector which is adapted to take the place of the conventional radio frequency (RF) stage of a radio receiver. Receivers designed for communications service in the high frequency (HF) and very high frequency (VHF) bands utilizing conventional RF stages comprising tunable resonant circuits usually experience interference from adjacent channels. The reason for this is the fact that a voice channel need comprises a bandwidth of only a few kilohertz and at the high carrier frequencies involved in the aforementioned frequency bands, the relative bandwidths are very small. The relative bandwidth is the ratio of the absolute bandwith to the carrier frequency. Extremely high Q tunable resonant circuits would be required at such relative bandwidths to effectively select a desired channel and reject nearby adjacent channels and such high Q tunable resonant circuits are beyond the practical state of the art at the present time. The present invention comprises a tunable preselector which has the effective Q required to select only a desired channel. The circuitry includes a wideband tunable resonant circuit for selecting a group of channels centered on the desired channel, and first mixer means to heterodyne this group of channels down to a fixed intermediate frequency utilizing a variable frequency local oscillator. The wideband intermediate frequency signal is then passed through a notch filter which removes the desired channel therefrom, leaving the undesired channels on either side thereof. These undesired channels are then heterodyned up to their original frequencies by means of a second mixer fed by the same local oscillator and these undesired channels are then subtracted from the originally selected group of channels to yield only the desired channel. The advantage of this circuit is that all of the tunable resonant circuits are widebanded and hence low or moderate Q and the notch filter which determines the selection of the desired frequency operates at a low, fixed frequency, and hence can be easily designed for the required Q.

It is thus an object of the invention to provide an improved electronic preselector for use in a radio receiver.

A more specific object of the invention is to provide a tunable preselector of high effective Q for use in the front end of a communications radio receiver.

Another object of the invention is to provide an electronic preselector capable of tuning to a plurality of narrowband channels in the high and very high frequency protions of the spectrum.

These and other objects and advantages of the invention will become apparent from the following detailed description and drawing, the sole figure of which is a block diagram of a preferred embodiment of the invention.

In the drawing, the novel preselector comprises the circuitry between the antenna 3 and the block 25, which may comprise conventional narrowband receiver circuitry such as mixers, local oscillators IF and detect stage, etc. Thus all of the preselector circuitry comprising blocks 5 through 23 replaces the RF stage of a conventional receiver. The preselector comprises a wideband tunable tank circuit 5, the output of which is applied in parallel to one input of a first mixer 15 and also to one input of wideband differential radio frequency amplifier 13 via cascaded phase control 9 and attenuator 11. A wideband fixed-tuned intermediate frequency amplifier 17 selects and amplifies the difference frequency between the two inputs of the first mixer, the local oscillator input of which is obtained from the oscillator 23. The output of amplifier 17 is passed through notch filter 19 which includes a passband approximately the same width as that of amplifier 17 but with a notch or stop band in the center thereof, the stop band being equal in absolute bandwidth to each one of the communication channels to which it is desired to tune. The output of notch filter is heterodyned up to the frequency originally received by circuit 5 by means of a second mixer 31, the output of which is applied to the second input of wideband differential RF amplifier 13. The circuit 5, the oscillator 23 and the amplifier 13 are gang-tuned as indicated by the mechanical connection 7 in such a way that circuit 5 and amplifier 13 are always tuned to the same center frequency and have approximately the same relatively wide bandwidth, and the local oscillator 23 is tuned to a frequency which differs from the center frequencies of the circuit 5 and amplifier 13 by a fixed amount which is equal to the center frequency of the IF amplifier 17. The gang-tuned mechanism may also extend to the succeeding conventional receiver stages 25, as shown by the dashed-line connection thereto. To illustrate the operation of the circuit, assume that the circuit 5 and amplifier 13 are tunable over the range of frequencies of interest and each has a bandwidth equal to five times the width of each channel. By tuning circuit 5 to a given desired channel, two undesired channels above the desired one and two below the desired one are also picked up and applied to mixer 15 and the amplifier 13. Thus five channels appear in the IF amplifier 17 but with a greatly reduced carrier frequency and hence a much larger relative bandwidth. The notch filter 19 removes the desired channel from the intermediate frequency signal. This is accomplished by means of fixed frequency circuitry operating at a much lower frequency than the incoming signals and is thus easily accomplished by means of high Q ceramic or mechanical filter elements, for example. The output of the notch filter will thus comprise the four undesired channels above and below the desired one, modulated onto the intermediate frequency carrier. This signal is then heterodyned with the output of the oscillator 23 in second mixer 21. One of the modulation products of this heterodyning will be the sum frequency of the two mixer inputs. Such sum frequency will of course be the same frequency at which these channels were originally received by circuit 5. Thus the wideband tuned circuits of differential amplifier 13 will select this sum frequency from the output of the second mixer. The differential amplifier comprises a means to subtract one of its inputs from the other by known means such as a three-winding transformer or a resistor matrix and to amplify the resulting difference signal. In the present example, the input of amplifier 13 from the attenuator 11 would comprise the five adjacent received channels with the desired one in the center and the other input from the second mixer would comprise only the four undesired channels at exactly the frequency as they appear at the other input of amplifier 13. Thus the difference between the two inputs of the differential amplifier 13 is only the desired channel, all four of the undesired channels having been cancelled. The desired channel is then applied to the conventional circuitry 25. It should be noted that the succeeding cricuitry 25 need not contain any tunable high Q circuits since the desired signal would be heterodyned down to an intermediate frequency therein. In order to achieve efficient cancellation of the undesired channels applied to the amplifier 13 at its two inputs, the amplitude and phase of the signals applied thereto over the two paths must be approximately equal. The variable phase control 9 and the variable attenuator 11 provides a means for equalizing these two parameters of the two inputs of amplifier 13. As mentioned above, the described circuitry contains only wideband tunable circuits, yet it has a selectivity or bandwidth over a wide frequency range determined by the high Q characteristics of the filter 19. The invention thus permits the crowding of a great many communication channels into a given portion of spectrum.

While the invention has been described in connection with a preferred embodiment, obvious modifications thereof will occur to those skilled in the art, accordingly, the invention should be limited only by the scope of the appended claims.

What is claimed is:

1. A preselector adapted to function as a high Q, high selectivity front end for a radio receiver, comprising; a wideband tunable resonant circuit adapted to be tuned simultaneously to a plurality of communications channels including a desired channel and a plurality of undesired channels on either side thereof, a differential radio frequency amplifier adapted to be tuned over the same frequency band as said resonant circuit and with the same wide bandwidth, first means to heterodyne the output of said resonant circuit down to a common intermediate frequency signal, filter means adapted to remove said desired channel from said intermediate frequency signal and pass said undesired channels on either side thereof, and second means to heterodyne said undesired channels up to their orignially received frequencies, the inputs to said differential amplifier being the output of said resonant circuit and said heterodyned undesired channels.

2. The circuit of claim 1 wherein said first and second means to heterodyne said channels comprises first and second mixers with a common local oscillator.

3. The circuit of claim 2 wherein said resonant circuit, said differential radio frequency amplifier, and said local oscillator are gangtuned.

4. An electronic preselector adapted to replace the conventional radio frequency stage of a radio receiver, comprising; tunable means for selecting a group of adjacent channels centered on a desired channel, first mixer means to heterodyne said group of channels down to a fixed intermediate frequency, means to remove said desired channel from said intermediate frequency and second mixer means to heterodyne the remaining channels up to their original frequency, and tuned differential amplifier means for subtracting said remaining channels from the output of said tunable means.

5. The circuit of claim 4 further including means to equalize the phase and amplitude of the signals at the inputs of said differential amplifier means.

References Cited

UNITED STATES PATENTS

| | | | |
|---|---|---|---|
| 2,104,635 | 1/1938 | Breedlove | 325—475X |
| 2,179,872 | 11/1939 | Wilbur | 325—474X |

GROUP ART UNIT 233, Primary Examiner

R. L. RICHARDSON, Assistant Examiner

U.S. Cl. X.R.

325—431, 473